(12) United States Patent
Smatloch et al.

(10) Patent No.: US 8,667,679 B2
(45) Date of Patent: Mar. 11, 2014

(54) METHOD OF MAKING A TURBOCHARGER HOUSING

(75) Inventors: Christian Smatloch, Paderborn (DE); Elmar Grussmann, Altenbeken (DE); Frank Arlt, Hövelhof (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 148 days.

(21) Appl. No.: 13/098,602

(22) Filed: May 2, 2011

(65) Prior Publication Data

US 2012/0102737 A1    May 3, 2012

(30) Foreign Application Priority Data

May 4, 2010 (DE) .......................... 10 2010 019 404

(51) Int. Cl.
*B21K 25/00*    (2006.01)

(52) U.S. Cl.
USPC ......... 29/889.2; 29/445; 29/557; 29/888.024; 29/889.22; 60/598; 415/170.1; 415/204

(58) Field of Classification Search
USPC ............ 29/445, 557, 888.024, 889.2, 889.22; 60/598, 602; 415/170.1, 204
See application file for complete search history.

(56) References Cited

U.S. PATENT DOCUMENTS

| | | | | |
|---|---|---|---|---|
| 3,969,804 | A | * | 7/1976 | MacInnes et al. ........ 29/888.025 |
| 4,181,466 | A | * | 1/1980 | Owen ........................... 415/204 |
| 4,900,225 | A | * | 2/1990 | Wulf et al. ................. 415/224.5 |
| 7,337,551 | B2 | * | 3/2008 | Roth et al. ....................... 33/559 |
| 8,250,760 | B2 | * | 8/2012 | Petitjean et al. ............... 29/889.2 |
| 8,382,429 | B2 | | 2/2013 | Grussmann et al. |
| 2002/0085932 | A1 | * | 7/2002 | Loffler et al. ................. 417/407 |
| 2008/0209905 | A1 | * | 9/2008 | Petitjean et al. ................ 60/602 |
| 2009/0022580 | A1 | * | 1/2009 | Hall .............................. 415/160 |
| 2010/0310364 | A1 | * | 12/2010 | Botsch et al. .............. 415/212.1 |

FOREIGN PATENT DOCUMENTS

| | | | |
|---|---|---|---|
| DE | 44 24 452 A1 | 1/1996 | |
| DE | 195 28 429 A1 | 2/1997 | |
| DE | 100 22 052 A1 | 3/2001 | |
| DE | 102 20 485 A1 | 11/2003 | |
| DE | 202008002380 | 7/2008 | |
| EP | 0079754 | * 11/1982 | ............... B23P 1/04 |
| EP | 2 180 163 | 4/2010 | |
| JP | 55-037508 | 3/1980 | |
| JP | 2002-349276 | 12/2002 | |

* cited by examiner

*Primary Examiner* — Alexander P Taousakis
(74) *Attorney, Agent, or Firm* — Henry M Feiereisen LLC

(57) ABSTRACT

In a method of making a turbocharger housing surfaces of a sheet-metal shell which bound a gap towards the turbine wheel are measured, after the sheet-metal shell has been joined with a bearing flange provided for support of a turbine wheel, to generate measuring values. Subsequently, the bearing flange is machined in dependence on the measuring values for establishing a position of the turbine wheel in relation to the bearing flange and thus of the sheet-metal shell.

10 Claims, 1 Drawing Sheet

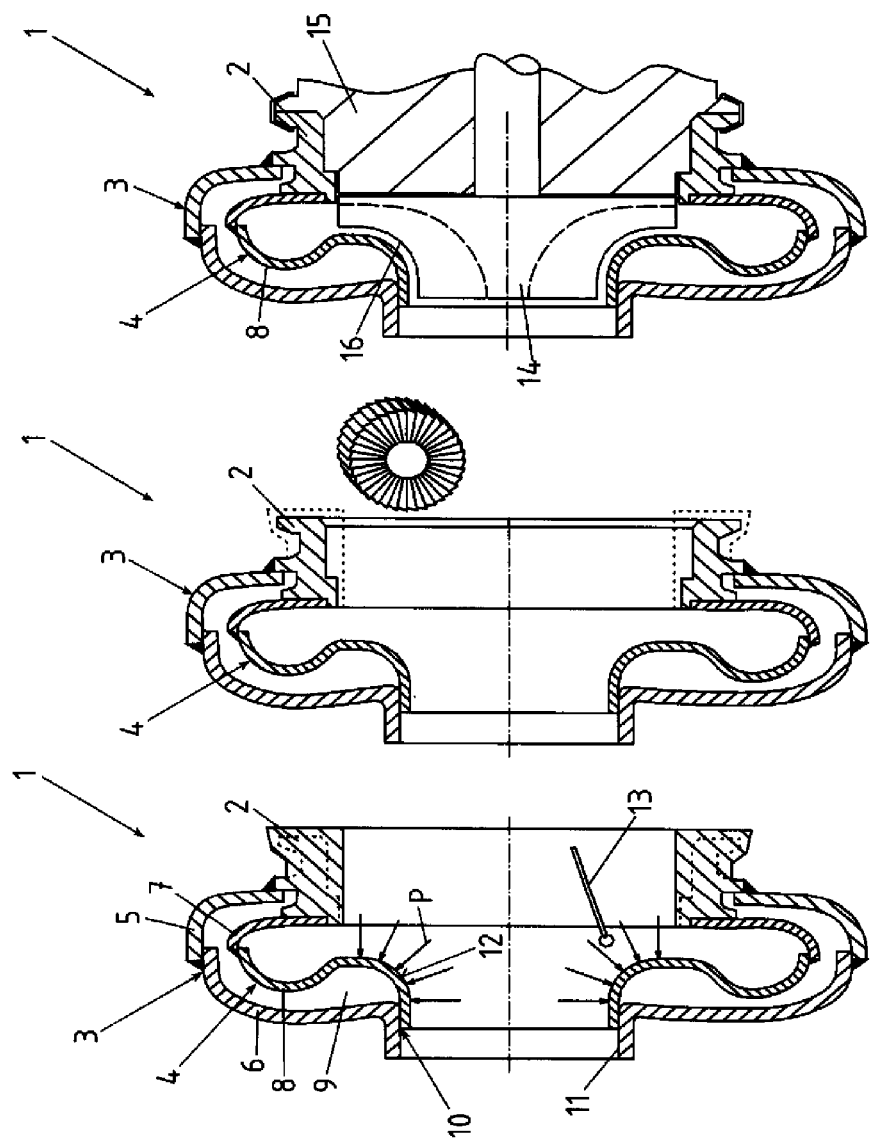

US 8,667,679 B2

METHOD OF MAKING A TURBOCHARGER HOUSING

CROSS-REFERENCES TO RELATED APPLICATIONS

This application claims the priority of German Patent Application, Serial No. 10 2010 019 404.2, filed May 4, 2010, pursuant to 35 U.S.C. 119(a)-(d), the content of which is incorporated herein by reference in its entirety as if fully set forth herein.

BACKGROUND OF THE INVENTION

The present invention relates to a method of making a turbocharger housing.

The following discussion of related art is provided to assist the reader in understanding the advantages of the invention, and is not to be construed as an admission that this related art is prior art to this invention.

Internal combustion engines for motor vehicle are increasingly charged through provision of a turbocharger in order to realize efficient fuel consumption. Turbochargers are exposed during operation to significant mechanical stress and in particular thermal stress. At the same time the weight of such an assembly should be as small as possible so as not to adversely affect the overall weight of the motor vehicle and thus fuel consumption.

German patent document DE 100 22 052 A1 attempts to attain sufficient service life despite the exposure to high stress and the need for small weight by proposing to construct superchargers using sheet metal and to separate the exhaust-carrying components from the supporting or sealing outer structure. Practice has shown, however, that the manufacture of such turbocharger designs in sheet-metal construction becomes very difficult to implement.

In general, a gap is provided between the turbocharger housing and the turbine wheel. The width of the gap plays a crucial factor for the effectiveness of the turbocharger. When producing sheet-metal housings through a forming process, such as e.g. deep-drawing or compression, the manufacturing tolerances are inadequate and become even greater as a result of thermal joining processes. These fluctuations of the tolerances during manufacture of turbocharger housing in sheet-metal construction pose therefore a problem.

It would therefore be desirable and advantageous to provide an improved method of making a turbocharger housing to obviate prior art shortcomings and to produce a turbocharger housing of superior efficiency.

SUMMARY OF THE INVENTION

According to one aspect of the present invention, a method of making a turbocharger housing includes the steps of joining a sheet-metal shell with a bearing flange provided for support of a turbine wheel, measuring first surfaces of the sheet-metal shell which bound a gap towards the turbine wheel to generate first measuring values, and machining the bearing flange in dependence on the first measuring values for establishing a position of the turbine wheel in relation to the bearing flange and thus of the sheet-metal shell.

In accordance with the present invention, a turbocharger housing has a bearing flange which supports a turbine wheel and is connected to at least one sheet-metal shell of the turbocharger housing. The sheet-metal shell thus defines jointly with the turbine wheel a gap. After joining the sheet-metal shell with the bearing flange, those surfaces which bound the gap to the turbine wheel are measured. The turbine wheel has hereby a constant geometry and the distance of the sheet-metal shell relative to the bearing flange can vary as a result of tolerances caused during the forming and joining processes. This fluctuation of the distance is however of no concern so long as those surfaces are not involved as boundary for the gap in combination with the turbine wheel. In accordance with the invention, the bearing flange is machined in dependence on the values as measured on the sheet-metal shell in such a way as to adjust the position of the turbine wheel in relation to the bearing flange and thus to the sheet-metal shell. Therefore, the invention departs from conventional thinking to increase the manufacturing accuracy during forming of the sheet-metal shell but pursues an approach by which the sheet-metal shell, after undergoing forming and joining operations, i.e. once all manufacturing steps that affect the relative position with respect to the bearing flange have been undertaken, is measured and only then the position of the turbine wheel is adjusted to the position of the sheet-metal shell.

A method according to the present invention permits the realization of defined gap dimensions between a turbine wheel and an inner system of a turbocharger housing designed in sheet-metal construction. As a result, a turbocharger system can be manufactured with high precision and superior efficiency, even when constructed in lightweight configuration. Moreover, the performance is uniform and reproducible for a turbocharger line manufactured in series so that engines or vehicles equipped with such turbocharger housings operate with comparable efficiency.

Another benefit of the invention is the realization of a smallest minimum gap between the turbine wheel and the sheet-metal shell of the inner system, while preventing a contact of these components, so called rubbing, thus positively affecting the durability of the overall system.

A method according to the present invention is applicable for turbocharger housings and integrated turbocharger manifold housings.

The manufacturing accuracy may be further enhanced through a final quality control by again measuring, after machining the bearing flange, the critical region of the sheet-metal shell in relation to the bearing flange, advantageously using the same measuring devices. This results in a 100% quality control before installation or shipment.

According to another advantageous feature of the present invention, the position of the turbine wheel in relation to second surfaces of a bearing housing of the turbine wheel adjoining the bearing flange can be measured before the actual machining step to produce second measuring values, and the second measuring values can then be taken into account when executing the machining step. The position of the turbine wheel in relation to its bearing housing has tolerances. In order to compensate these tolerances, the position of the turbine wheel relative to those surfaces of the bearing housing which rest upon the bearing flange, when installed, are measured. These measuring values are additionally considered when computing the machining operation for the bearing flange so that all tolerances of the assembly can further be minimized. Thus, the tolerances between the turbine wheel and the bearing housing are taken into account.

According to another advantageous feature of the present invention, the machining step is executed in the absence of ingress of cuttings into an interior of the turbocharger housing. The potential presence of metal cuttings during the machining operation in proximity of undercut clearances that exist in turbocharger housings is problematic and therefore must either be removed or even better prevented from migrating into these spaces. The latter can be realized through suitable positioning of the bearing flange during machining or through suitable material removing tools, or through certain measures for removal of cuttings, either through a directed or intense cooling or lubricating jet or through screens to shield the inner system of the turbocharger housing from the bearing flange. Advantageously, regions of the turbocharger housing in neighboring relationship to the bearing flange can be sealed off during the machining step. This may be realized by special reusable inserts. Also conceivable is the introduction of a shapeable compound of for example waxy or foamy consistency into the inner system of the turbocharger housing. Such a waxy or foamy compound may be removed by a thermal and/or chemical process from the interior of the turbocharger housing, in particular through melting out.

The possible presence of metal cuttings that adhere to the shapeable compound are thus virtually flushed away and expelled from the inner system.

Measuring the sheet-metal shell may be realized, using a tactile measuring member. Also conceivable is a contactless measuring of the sheet-metal shell by scanning the surface.

According to another advantageous feature Of the present invention, the sheet-metal shell can be a component of an inner structure of a double-walled turbocharger housing, with the inner structure having plural sheet-metal shells which can be welded to one another. The one sheet-metal shell which bounds a gap with the turbine wheel is spaced from the bearing flange and is effectively positioned in opposition thereto. This sheet-metal shell to be measured has a radial circumference which is welded to a second sheet-metal shell which in turn is secured to the bearing flange. Thus, the sheet-metal shell being measured is only indirectly connected to the bearing flange. This type of construction illustrates the presence of unavoidable manufacturing tolerances as a result of both sequential joining zones. The manufacturing tolerances of the bearing flange, of the sheet-metal shell directly arranged on the bearing flange, and of the sheet-metal shell being measured add up. These tolerances can now advantageously be compensated by the method according to the invention.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 is a cross section of a turbocharger housing in sheet-metal construction with a sheet-metal shell to be measured;

FIG. 2 is a cross section of the turbocharger housing undergoing a machining step following the step of measuring the sheet-metal shell; and FIG. 3 is a cross section of the assembled turbocharger housing with inserted turbine wheel.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a cross section of a turbocharger housing, generally designated by reference numeral 1 and constructed in sheet-metal construction. The turbocharger housing 1 includes a supporting bearing flange 2 which is connected with an outer system 3 and an inner system 4. The outer system 3 and the inner system 4 are each formed of two sheet-metal shells 5, 6, 7, 8 to be welded together about their circumference. The sheet-metal shells 5, 7 in proximal relationship to the bearing flange 2 are respectively secured about the circumference to the bearing flange 2. These two sheet-metal shells 5, 7 are engaged on the inside by the bearing-flange-distal sheet-metal shells 6, 8 of the outer and inner systems, respectively. The inner system 4 is arranged in spaced-apart relationship to the outer system 3 and defines an airgap 9 towards the outer system 3. The airgap 9 is provided to screen the inner system 4 against stress caused by heat. The outer system 3 seals off the turbocharger housing 1 while the inner system 4 forms the desired flow passageways. The inner system 4 is connected on its side distal to the bearing flange 2 with the respective sheet-metal shell 6 of the outer system 3 by a sliding seat 10. An outlet flange 11 of the turbocharger housing 1 is disposed in the region of the sliding seat 10.

The bearing flange 2 is still shown unfinished in the illustration of FIG. 1. A dotted line is visible within the hatching of the bearing flange 2 to indicate the final contour of the bearing flange 2. The exact position of this end contour is determined by measuring the sheet-metal shell 8, arranged distal to the bearing flange 2, in a region of a surface 12 as indicated by arrows P. The individual arrows P illustrate the position of measuring points which are shown by way of example only. The measurement is realized by a tactile measuring member 13, shown only schematically and introduced into the turbocharger housing 1 from the side of the bearing flange 2. After analyzing the measuring points and determining the position of the surface 12 in relation to the bearing flange 2, the machining operation of the bearing flange 2 commences, as shown schematically in FIG. 2. The bearing flange 2 is hereby machined to receive the contour as indicated by the dotted line, with the exact contour profile being determined by the position of the surface 12 of the sheet-metal shell 8.

FIG. 3 shows the final assembly with incorporated turbine wheel 14 which is held on the bearing flange 2 by a bearing housing 15.

Before placing the turbine wheel 14 and the bearing housing 15 of the turbine wheel 14 in the bearing flange 2, the machined bearing flange 2 may be measured again for quality control so as to ensure that the machining operation did not cause additional manufacturing tolerances and to ensure that the bearing housing 15 exactly assumes with the turbine wheel 14 the desired position in relation to the bearing flange 2 and to the sheet-metal shell 8 to be measured of the inner system 4.

A method according to the present invention positively ensures that no turbocharger housing is produced with unacceptable tolerances as any turbocharger housing of incorrect geometry can be discarded as a result of the measurements. A method according to the present invention can be executed by means of an automated data processing equipment which analyzes the ascertained measuring data as input parameter and computes in response to the input parameter the contour of the bearing flange 2 to accurately establish a clearance or gap 16 between the turbine wheel 14 and the surface 12.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method of making a turbocharger housing, comprising the steps of:
   forming a sheet-metal shell;
   joining the formed sheet-metal shell with a bearing flange provided for support of a turbine wheel to be non-detachably secured to the bearing flange;
   after the forming of the sheet-metal shell and its securing to the bearing flange, measuring first surfaces of the sheet-metal shell which bound a gap towards the turbine wheel to generate first measuring values;
   measuring the position of the turbine wheel in relation to second surfaces of a bearing housing of the turbine wheel adjoining the bearing flange to generate second measuring values; and
   thereafter machining the bearing flange in dependence on the first measuring values and with consideration of the second measuring values for establishing a position of the turbine wheel in relation to the bearing flange and thus to the sheet-metal shell.

2. The method of claim 1, wherein the machining step is executed in the absence of ingress of cuttings into an interior of the turbocharger housing.

3. The method of claim 2, wherein regions of the turbocharger housing in neighboring relationship to the bearing flange are sealed off during the machining step.

4. The method of claim 3, wherein the regions of the turbocharger housing in neighboring relationship to the bearing flange are sealed off with a waxy or foamy compound.

5. The method of claim 4, further comprising the step of removing the waxy or foamy compound through a thermal and/or chemical process from the interior of the turbocharger housing after executing the machining step.

6. The method of claim 1, wherein the measuring step includes the use of a tactile measuring member.

7. The method of claim 1, wherein the measuring step is executed contactless.

8. The method of claim 1, wherein the sheet-metal shell is a component of an inner structure of a double-walled turbocharger housing, with the inner structure having plural sheet-metal shells which are welded to one another.

9. The method of claim 8, wherein the sheet-metal shell is connected indirectly via a further sheet-metal shell with the bearing flange.

10. The method of claim 1, wherein the joining of the formed sheet-metal shell with the bearing flange is executed by welding.

* * * * *